Patented Nov. 2, 1943

2,333,189

UNITED STATES PATENT OFFICE 2,333,189

PLASTIC BITUMINOUS INSULATING COMPOSITION

Orville V. McGrew, Chicago, Ill.

No Drawing. Application July 22, 1940,
Serial No. 346,863

9 Claims. (Cl. 106—278)

This invention relates to a plastic bituminous insulating composition adaptable for use upon building and other structures, and particularly adapted to be sprayed on such structures in thick layers which will not crawl, slide, or slip even after application to vertical or sloping structures, which can be applied cold, and which will dry rapidly.

In one modification the plastic composition includes a large amount of cork which improves the heat insulating qualities of the material, and this aspect of the invention is covered specifically in my co-pending application Serial No. 264,492, filed March 27, 1939.

Bituminous products are well known for many purposes and are available in a variety of forms. There are certain classes of bituminous materials which must be applied hot, these containing very little solvent and setting rapidly to form a coating material. These hot materials, however, do not have the characteristics necessary for application to certain types of work, particularly to housing structures or the like.

Bituminous materials are also available which employ aqueous emulsions of asphalt as the base, but, these, in order to be applied properly to a vertical surface without running, must be loaded heavily with pigments and furthermore do not resist weathering due to the fact that the asphalt emulsions are not totally non-reversible. Therefore, there is a tendency for water to re-emulsify or to penetrate the asphalt and cause destruction by freezing or otherwise.

Cut-back asphalts are also known. These materials consist of a bituminous base, which is dissolved in a volatile hydrocarbon solvent such as naphtha. On the evaporation of the naphtha, the asphalt is left as a solid material. The present invention deals with cut-back asphalts. In applying a cut-back asphalt to a vertical structure by spraying, it is necessary that the product, once applied, shall not run on application, and shall not slide or crawl after application, shall dry rapidly even though in thick layers, and shall produce, after application, a waterproof, weatherproof, insulating surface. In order to develop a material capable of forming such a surface, the bituminous material itself must be carefully selected, the ratio of solvent to asphalt carefully controlled, and more important, the proportion of filler to asphalt and solvent must be carefully regulated.

In my co-pending application, Serial No. 264,492, is described a cut-back asphalt insulating composition suitable to application to vertical wall structures in thick layers, which embodies a filler predominantly of cork. The cork of course varies in density to a certain extent, but the variation in density between the various types of cork is relatively small compared to the difference between the density of cork and other fillers.

I have now discovered that other fillers may be substituted for cork in the formulas of my foregoing application, provided due allowance is made for the density of the fillers. The present invention includes a formula by which not only the usual fillers such as clay, zinc oxide, litharge, powdered limestone, slate dust or flour, kieselguhr, tripoli, and other inert materials of usual density, but very light and very heavy fillers such as vermiculite, granulated rubber, or rubber grindings, and other rubber products; sawdust, barium sulfate and others may be suitably employed.

The determination of the true density of a filler is quite a difficult problem. For example, mica is an excellent filler. Mica in mineral form has a specific gravity of 2.6 to 3.2 but commercially it is used in very finely divided form and has a weight as low as 2.5 lbs. per gallon, or a specific gravity of approximately 0.3. In the present case the term "density" is used to indicate the effective volume which the particular filler occupies in the liquid or solid, as the case may be. It will be hereinafter explained how this density may be calculated.

The following are examples of products prepared in accordance with this invention:

Example I

The figures hereinafter given are based upon a 100 lbs. batch.

31.9 lbs. of an "oleum glue base" are prepared using approximately 60% of bituminous material and 40% of a petroleum solvent having an initial boiling point of 315° F., an end point of 375° F., a flash point of 100° F., and a specific gravity at 60° F. of 53° to 55° Bé. This product has a melting point of approximately 200° F. before addition of the solvent and a penetration at 77° F. of 12 mm. The Mid-Continent asphalt employed in this product is a mixture of Oklahoma base and Arkansas base flux oils which have been air blown to raise their melting point to about 150° F., after which about 33% of gilsonite is added. While a melting point of about 200° F. and a penetration of about 12 mm. is preferred, there is no substantial variation over a range of approximately 10° plus or minus, and about 3 mm. penetration plus or minus.

The glue base just described is fluid enough to be handled in manufacturing but requires additional thinning for application.

With it are mixed 23.2 lbs. of a "light glue base" which is composed of Mid-Continent asphalt having a melting point of approximately 145° F. and a penetration of 48 mm. at 77°. This is cut back with petroleum solvent having an initial boiling point of 370° F., an end point of 500° F., a flash point of 135° F., and a specific gravity at 60° F. of 40° to 42° Bé. The solvent is employed in an amount of approximately 35% to 40% of the "light glue base," variations being to take account of local climatic conditions. Similarly, the ratio of oleum glue base to "light glue base" may be altered, more of the "oleum glue base" being used in warm climates than in cold.

Filler is then added to the composition in sufficient amount to give it the proper body for weather resistance, flow resistance, and fire resistance. A suitable proportion is 18.4 pounds of Kankakee clay having a density of 6.48 lbs. per gallon; 9.7 lbs. of asbestos floats having a weight of 3.07 lbs. per gallon; 3.5 lbs. of No. 160 mica having a weight of 2.71 lbs. per gallon; and 0.2 lb. of cork dust having a weight of 1.40 lbs. per gallon.

Additional solvent and thinner is then added to the mixture to give it the proper viscosity, but ordinarily the control point is 60 to 70 seconds Stormer viscosity. In the above example this was obtained by adding 5.4 lbs. of engine distillate weighing 6.9 lbs. per gallon; and 7.7 lbs. of "oleum spirits" having a weight of 6.4 lbs. per gallon.

"Oleum spirits" is a trade designation for a petroleum distillate fraction between naphtha and kerosene, having a flash point of approximately 100° F.; a Bé. gravity of approximately 54 to 56°; an initial boiling point of approximately 310° F.; and an end point of approximately 390–400° F.

"Engine distillate" is a trade designation for a petroleum distillate or spirit approximating No. 1 fuel oil and about the first cut above kerosene. The product has a Bé. gravity of approximately 38 to 40°; an initial boiling point of approximately 375° F.; an end point of approximately 500° F.; and a flash point of approximately 140–145° F.

The resulting fluid has a volume of 10.70 gallons as compared with 16.74 gallons of materials used in it. The shrinkage is due to absorption of solvent by the fillers and also to the fact that the true density of the fillers is quite different from the apparent density thereof in the form used. Since the asphalt and solvent are in effect liquids, the filler will by subtraction be seen to occupy only 1.37 gallons of space. The specific gravity of the material in the wet form is 1.15. Upon drying, a further shrinkage occurs, the apparent density of the material increasing to 1.35 and the apparent volume occupied being reduced to approximately 5.76 gallons. The weight of the material reduces to about 64.86 lbs. The original weight per gallon is 9.35 lbs. and in dry form is 11.255 lbs.

Of the final volume of 5.76 gallons, approximately 3.89 gallons is taken up by the asphalt, leaving a difference of 1.87 gallons of which approximately 1.37 gallons is occupied by 31.8 lbs. of filler. The difference between these figures, or .50 gallon is assumed to represent voids in the material. The true density of the filler is, therefore, 2.78, which represents 26% of the total true volume of the dry material (5.26 gallons). The proportion in the liquid is 137/1070 or 12.8%. The remaining constituents represent 74% in the solid and 87.2% in the liquid.

The liquid had a specific gravity of 1.15 and the solid of 1.35 (uncorrected). The filler factors are determined as follows:

$$\text{Dry filler factor} = \frac{A}{B} \times \frac{C}{D}$$

where A is the percentage by volume truly occupied by the filler (determined as already indicated), B is the percentage of the volume truly occupied by the remaining constituents, C is the true specific gravity of the filler as it exists in the product, and D is the true density of the product after allowing for voids determined as indicated.

In the above formula, substitution of the results for Example I gives the following equation:

$$\frac{26+}{74-} \times \frac{2.78}{1.47} = 0.65$$

For determining the liquid filler factor, the formula is:

$$\text{Wet filler factor} = \frac{E}{F} \times \frac{C}{H}$$

where E is the percentage by volume truly occupied by the filler in the liquid, F is the percentage by volume of the remaining constituents of the liquid, C is again the true density of the filler as determined above, and H is the specific gravity of the liquid as it is to be applied.

Substituting the wet figures in Example I, gives the equation:

$$\frac{12.8}{87.2} \times \frac{2.78}{1.15} = 0.354$$

In general the factor for the dry material will be between 0.60 and 1.00, and preferably between 0.65 and 0.85. For the liquid, the factor should be between 0.20 and 0.50, but preferably between approximately 0.25 and 0.45. Variations within this formula are shown in the following examples:

*Example II*

A siding material was prepared according to the following formula:

| Pounds | Ingredients | Gallons |
|---|---|---|
| 33.2 | "Oleum glue base" | 4.43 |
| 19.4 | "Light glue base" | 2.59 |
| 6.5 | Engine distillate | .94 |
| 5.9 | "Oleum spirits" | .92 |
| 20.3 | Kankakee clay | 3.12 |
| 11.2 | Asbestos floats | 3.65 |
| 3.3 | No. 160 mica | 1.24 |
| .2 | Cork dust | .14 |
| 100.0 | | 17.03 |

The actual yield from the above formula is 10.75 gallons, having a specific gravity of 1.12. The liquids occupied 8.88 gallons of this, leaving 1.87 gallons actually occupied by the filler.

The product yielded, on drying, 6 gallons of material weighing 66.56 lbs. and having an apparent specific gravity of 1.33. Of this product, 3.71 gallons was asphalt weighing 31.56 lbs. The remainder, or 1.87 gallons, was occupied by the filler which weighed 35 lbs. Its true specific gravity was, therefore, 2.25. It occupied 33.5% of the true volume of the solid material and 17.4% by volume of the liquid.

In the above formula "oleum glue base" and

"light glue base" are made up in the same manner as hereinbefore described.

The true volume of the dry product being 5.58 gallons, its true specific gravity was 1.43. The dry filler factor was, therefore, $$\frac{33.5}{66.5} \times \frac{2.25}{1.43} = 0.79$$

The wet filler factor was, $$\frac{17.4}{82.6} \times \frac{2.25}{1.12} = 0.42$$

*Example III*

This example relates to one similar to those set forth in my aforesaid co-pending application, Serial No. 264,492. This material is prepared according to the following table:

| Pounds | Ingredients | Wt./gal. | Gallons |
|---|---|---|---|
| 52.4 | "Oleum glue base" | 7.50 | 7.00 |
| 15.7 | "Oleum spirits" | 6.20 | 2.53 |
| 14.4 | 2% chromic acid water solution | 8.33 | 1.70 |
| 5.5 | Asbestos floats | 3.07 | 1.79 |
| 1.4 | Pulverized cork | 1.40 | 1.00 |
| 3.6 | Asbestos long fibre | 3.78 | 1.16 |
| 7.0 | 10–20 mesh cork | .75 | 9.35 |
| 100.00 | | | 24.53 |

The actual yield of the above material was 16.2 gallons for 100 lbs.

With this material, as in the previous examples, the solvent and thinner will preferably be a material having a minimum flash of 100° F. and an initial boiling point of 315° F., an end point of 375° F. and a specific gravity of 53° to 55°. On the other hand, if the material is used where there is no danger of fire, V. M. & P. solvent with lower flash and boiling points may be employed. Of course other volatile solvents may be substituted, but, in any event, the viscosity of the material must be adjusted to a proper spraying consistency.

The above cork mixture had an initial density of 0.74. With the above material the actual density of the resulting dry product will vary considerably, depending upon the manner of application and the surface to which the material is applied. This is due to the fact that, upon drying, there is a considerable proportion of voids in the mass. In practice, the apparent specific gravity will vary from 0.42 to 0.54.

Since the liquid content of the fluid amounts to 11.23 gallons, the filler occupies a true volume of 4.97 gallons and thus has a true density of 0.42, since it weighs 17.5 lbs.

The volume of the dry material will vary from 10.9 to about 13.1 gallons, of which 8.7 gallons will actually represent the total volume of the filler and the asphalt, and the rest will represent air spaces acting as insulating chambers within the product. The apparent density of the dry material is from 0.42 to 0.54 but its true density, based upon a volume of 8.7 gallons for 48.9 lbs. of material, is 0.677. The filler occupies 57.1% of the solid, and 31% of the liquid. The dry filler factor is, therefore:

$$\frac{57.1}{42.9} \times \frac{0.42}{0.677} = 0.81$$

The wet filler factor is:

$$\frac{31}{69} \times \frac{0.42}{0.74} = 0.25$$

It will be observed that Example III has a dry filler factor which is on the high side and a wet filler factor which is on the low side of the formula. This is due to the fact that the filler is lighter than the volatile solvent and, therefore, the density of the material decreases rather than increases upon evaporation of the solvent. It is, therefore, preferred, when comparing a material which has a filler heavier than the solvent to one which has a filler lighter than the solvent, to use a more complicated formula in which D and H are both replaced by the average of D and H. In other words, the dry filler factor equals:

$$\frac{A}{B} \times \frac{2C}{D+H}$$

and the wet filler factor equals:

$$\frac{E}{F} \times \frac{2C}{D+H}$$

Using a modified formula, the following filler factors are obtained for the three examples just given.

| | Dry filler factor | Wet filler factor |
|---|---|---|
| 1 | 75 | 31 |
| 2 | 89 | 37 |
| 3 | 79 | 33 |

Using this more accurate formula, the dry filler factor should be between 0.60 and 1.00 and preferably between 0.70 and 0.90. The wet filler factor should be between 0.20 and 0.45 and preferably between 0.24 and 0.38.

The composition set forth in Example III had an extremely high insulating value, having a "K" factor of 0.42 or lower. The specific composition set forth in the composition had a "K" factor of 0.39. Slight modifications of the formula, however, for example by using more cork dust, will give a product having a much higher "K" factor.

Therefore, even though the larger cork particles give rise to serious problems in spraying, it is preferred to use them in order to produce high insulating value.

This application is a continuation-in-part of my co-pending application, Serial No. 264,492, filed March 27, 1939, which was a continuation-in-part of Serial No. 144,558, filed May 24, 1937, which was a division of Serial No. 115,254, filed December 10, 1936, which has now issued as Patent 2,145,027 dated January 24, 1939.

The foregoing detailed description is given for clearness of understanding only, and no unnecessary limitations should be understood therefrom.

What I claim as new, and desire to secure by Letters Patent, is:

1. A plastic bituminous insulating composition comprising a normally solid bituminous base, a volatile solvent for the bituminous base, and a filler, the ratio of solvent and filler to base being such as to produce a thick tacky sprayable composition suitable for application even to vertical structures in layers at least ⅛ inch in thickness without running, sliding, or slipping after application, and capable of drying uniformly throughout when so applied, and said material having a wet filler factor of between 0.20 and 0.45 inclusive, determined according to the following formula:

$$\text{Wet filler factor} = \frac{E}{F} \times \frac{C}{H}$$

where E is the percentage by volume occupied by the filler in the liquid, F is the percentage by volume of the remaining constituents of the liquid, C is the true specific gravity of the filler, and H is the specific gravity of the liquid as prepared for application.

2. A product as set forth in claim 1, in which the wet filler factor is between 0.25 and 0.45.

3. A plastic bituminous insulating material comprising a normally solid bituminous base, a volatile solvent for the bituminous base, and a filler, the ratio of solvent and filler to base being such as to produce a thick tacky sprayable composition suitable for application even to vertical structures in layers at least 1/8 inch in thickness without running, sliding, or slipping after application, and capable of drying uniformly throughout when so applied, and said material having a wet filler factor of between 0.25 and 0.45 inclusive, determined according to the following formula:

$$\text{Wet filler factor} = \frac{E}{F} \times \frac{C}{H}$$

where E is the percentage by volume occupied by the filler in the liquid, F is the percentage by volume of the remaining constituents of the liquid, C is the true specific gravity of the filler, and H is the specific gravity of the liquid as prepared for application; said product having the property of producing a dry flame-proof, insulating, adherent composition with high weathering characteristics, and having a dry filler factor of approximately 0.60 to 1.00, determined according to the following formula:

$$\text{Dry filler factor} = \frac{A}{B} \times \frac{C}{D}$$

where A is the percentage by volume truly occupied by the filler in the dry product, B is the percentage of volume truly occupied by the remaining constituents of the dry product, C is the true specific gravity of the filler as it exists in the product, and D is the true specific gravity of the dried product.

4. A product as set forth in claim 3, in which the dry filler factor of the dried product is from 0.65 to 0.85.

5. A plastic bituminous insulating material comprising a normally solid bituminous base, a volatile solvent for the bituminous base, and a filler, the ratio of solvent and filler to base being such as to produce a thick tacky sprayable composition suitable for application even to vertical structures in layers at least 1/8 inch in thickness without running, sliding, or slipping after application, and capable of drying uniformly throughout when so applied, and said product having a wet filler factor between 0.20 and 0.45, as determined by the following formula:

$$\text{Wet filler factor} = \frac{E}{F} \times \frac{2C}{D+H}$$

where E is the percentage by volume occupied by the filler in the liquid, F is the percentage by volume of the remaining constituents of the liquid, C is the true specific gravity of the filler, H is the specific gravity of the liquid as prepared for application, and D is the true specific gravity of the product after drying; said product having the property of producing a dry flame-proof, insulating, adherent composition with high weathering characteristics, and having a dry filler factor of approximately 0.70 to 1.00, determined according to the following formula:

$$\text{Dry filler factor} = \frac{A}{B} \times \frac{2C}{D+H}$$

where A is the percentage by volume truly occupied by the filler in the dry product, B is the percentage of volume truly occupied by the remaining constituents of the dry product, C is the true specific gravity of the filler as it exists in the product, D is the true specific gravity of the dried product, and H is the specific gravity of the liquid as prepared for application.

6. A product as set forth in claim 5, in which the dry filler factor is from 0.70 to 0.90 and the wet filler factor is from 0.25 to 0.35.

7. A composition as set forth in claim 1, in which the filler includes a substantial proportion of cork.

8. A plastic bituminous insulating material capable of drying in vertical sheets to a waterproof, weather-proof, flame resisting, insulating composition, comprising a normally solid bituminous base, a volatile solvent for the bituminous base, and a filler, the ratio of solvent and filler to base being such as to produce a thick tacky sprayable composition suitable for application to vertical structures in layers at least 1/8 inch in thickness without running, sliding, or slipping after application, said material having a wet filler factor of between 0.20 and 0.45, inclusive, determined according to the following formula:

$$\text{Wet filler factor} = \frac{E}{F} \times \frac{2C}{D+H}$$

where E is the percentage by volume occupied by the filler in the liquid, F is the percentage by volume of the remaining constituents of the liquid, C is the true specific gravity of the filler, H is the specific gravity of the liquid as prepared for application, and D is the true specific gravity of the product after drying.

9. A product as set forth in claim 8, in which the product is prepared by mixing approximately 31.9 lbs. of an "oleum glue base" including approximately 60% asphalt having a melting point of approximately 200° F. and 40% of petroleum solvent having a specific gravity at 60° F. of approximately 54° Bé., with approximately 23.2 lbs. of a "light glue base" composed of asphalt having a melting point of approximately 145° F. cut back with a petroleum solvent having a specific gravity at 60° F. of approximately 41° Bé., the solvent being approximately 35 to 40% of the "light glue base," and a filler comprising essentially clay, asbestos, and mica, together with thinner.

ORVILLE V. McGREW.